United States Patent [19]

Horacek

[11] Patent Number: 5,206,066
[45] Date of Patent: Apr. 27, 1993

[54] MELAMINE RESIN PREPREGS AND MELAMINE RESIN LAMINATES BASED ON MODIFIED MELAMINE RESINS

[75] Inventor: Heinrich Horacek, Puchenau, Austria

[73] Assignee: Chemie Linz Gesellschaft M.B.H., Linz, Austria

[21] Appl. No.: 911,931

[22] Filed: Jul. 10, 1992

[30] Foreign Application Priority Data

Aug. 5, 1991 [AT] Austria .................................. 1547/91

[51] Int. Cl.⁵ ............................................... B32B 5/12
[52] U.S. Cl. .................... 428/113; 428/175; 428/200; 428/224; 428/236; 428/268; 528/230; 528/254; 528/272; 528/300; 528/302; 528/332; 525/437; 525/441; 525/472; 427/207.1; 427/331
[58] Field of Search ............... 528/230, 254, 272, 300, 528/302, 332; 525/437, 441, 472; 428/113, 175, 200, 224, 236, 268; 427/207.1, 331

[56] References Cited

U.S. PATENT DOCUMENTS

| | | |
|---|---|---|
| 3,318,760 | 5/1967 | Boenig et al. |
| 3,959,202 | 5/1976 | Blank .................... 524/512 |
| 3,960,983 | 6/1976 | Blank .................... 525/496 |
| 4,613,527 | 9/1986 | Potter et al. .......... 427/412 |
| 4,922,002 | 5/1990 | Calbo, Jr. et al. ..... 560/193 |

FOREIGN PATENT DOCUMENTS

| | | |
|---|---|---|
| 0077067 | 4/1983 | European Pat. Off. |
| 0268809 | 6/1988 | European Pat. Off. |
| 0271073 | 6/1988 | European Pat. Off. |
| 2263294 | 7/1974 | Fed. Rep. of Germany |
| 3632588 | 4/1988 | Fed. Rep. of Germany |
| 3844049 | 7/1990 | Fed. Rep. of Germany |
| 3932139 | 4/1991 | Fed. Rep. of Germany |

OTHER PUBLICATIONS

Chemical Abstracts 109:74508m (1988).
Database WPIL 83-786,636 (Abstract of JP-A 58 (1983) 149,400).
Database WPI 78-68009A (Abstract of JP-A-53 (1978) 94,557).
Chemical Abstracts 81(24):153802k.
Chemical Abstracts 115(22):234131p.
Chemical Abstracts 113(24):213235u.
Chemical Abstracts 113:233606u (1990).
Chemical Abstracts 114:44452a (1991).
Chemical Abstracts 104:6794z (1986).

*Primary Examiner*—John Kight, III
*Assistant Examiner*—S. A. Acquah
*Attorney, Agent, or Firm*—Wenderoth, Lind & Ponack

[57] ABSTRACT

Melamine resin prepregs or melamine resin laminates which consist of a web-like fiber reinforcement which is impregnated with melamine resins which essentially comprise a) 40–85% by weight of at least partly etherified melamine resins, which are obtainable by reaction of melamine, formaldehyde and alkanols having 1 to 8 C atoms in a molar ratio of melamine formaldehyde:alkanol of 1:(5 to 6):(4 to 6), and b) 60–15% by weight of diols consisting of 25 to 75% by weight of polyester-diols and/or polyether-diols having a molecular weight of at least 400 g/mol and 75 to 25% by weight of low molecular weight diols having 2 to 12 C atoms.

9 Claims, No Drawings

MELAMINE RESIN PREPREGS AND MELAMINE RESIN LAMINATES BASED ON MODIFIED MELAMINE RESINS

The invention relates to melamine resin prepregs and melamine resin laminates obtained from these prepregs by thermal curing, the prepregs and laminates being based on modified melamine resins, and to modified melamine resins.

Because of their good light-fastness, abrasion resistance, resistance to chemicals, resistance to incandescence and surface hardness, melamine resin laminates based on impregnated papers have a wide field of use as decorative and protective films. They are furthermore used as industrial laminates, above all as electrical films because of their high tracking resistance.

Such laminates, which are obtained by impregnation of carrier webs of textiles, paper or glass non-wovens with aqueous solutions of melamine/formaldehyde precondensates and subsequent drying and curing at temperatures above 100° C., are described, for example, in EP-A-077 067. Melamine resin films which are obtained by coating papers with an at least 70% strength by weight aqueous solution of a methyl-etherified melamine resin are described in EP-B1-268 809.

The disadvantage of the known melamine resins and melamine resin laminates is, in particular, that they exhibit relatively high shrinkage during curing, that in many cases their mechanical properties are not adequate, and that above all they are very brittle. For these reasons, it was desirable to obtain melamine resins and melamine resin laminates which have, in particular, better mechanical properties and exhibit less shrinkage during curing.

It has been found, surprisingly, that such improved melamine resins, melamine resin prepregs and melamine resin laminates are obtained by using etherified melamine resins modified with specific diols.

The invention accordingly relates to melamine resin prepregs or melamine resin laminates which consist of a web-like fiber reinforcement impregnated with at least partly etherified, modified melamine resins which essentially comprise a) 40-85% by weight of at least partly etherified melamine resins, which are obtainable by reaction of melamine, formaldehyde and alkanols having 1 to 8 C atoms in a molar ratio of melamine:formaldehyde:alkanol of 1:(5 to 6):(4 to 6), and b) 60-15% by weight of diols consisting of 25 to 75% by weight of polyester-diols and/or polyether-diols having a molecular weight of at least 400 g/mol and 75 to 25% by weight of low molecular weight diols having 2 to 12 C atoms. The melamine resins can be partly or completely cured.

The invention furthermore relates to modified, at least partly etherified melamine resins which essentially comprise a) 40-85% by weight of at least partly etherified melamine resins, which are obtainable by reaction of melamine, formaldehyde and alkanols having 1 to 8 C atoms in a molar ratio of melamine:formaldehyde:alkanol of 1:(5 to 6):(4 to 6), and b) 60-15% by weight of diols consisting of 25 to 75% by weight of polyester-diols and/or polyether-diols having a molecular weight of at least 400 g/mol and 75 to 25% by weight of low molecular weight diols having 2 to 12 C atoms.

The etherified melamine resins are preferably etherified with alkanols having 1-4 C atoms.

The at least partly etherified, modified melamine resins preferably essentially comprise 50-70% by weight of at least partly etherified melamine resins and 50-30% by weight of diols.

The etherified melamine resins can be prepared, for example, in accordance with Kirk-Othmer, Encyclopedia of Chemical Technology, 1st edition, Volume 1 (1947) pages 756-759 by reaction of melamine with formaldehyde at about 80° C. in alkaline solution and subsequent etherification with an alkanol at about 70° C. in acid solution Excess water and unreacted alkanol can then be distilled off, after addition of, for example, toluene as an entraining agent. Etherified melamine resins are also commercially obtainable, for example hexamethoxyhexamethylmelamine (Cymel 303, Cyanamid; U 100, Chemie Linz), hexamethoxyhexabutylmelamine (Cymel 1156), hexamethoxypentamethylbutylmelamine (Cymel 1130), hexamethoxytetramethyldiethylmelamine (Cymel 1116), hexamethoxytrimethyltributylmelamine (Cymel 1133) and hexamethoxypentamethylisobutylmelamine (Cymel 1168). The commercially obtainable resins consist mainly of monomeric units, with small amounts of dimers and trimers.

The etherified melamine resins are modified by a content of diols. The diols preferably consist of 40-60% by weight of polyester-diols and/or polyether-diols and 60-40% by weight of low molecular weight diols. Polyester-diols can be prepared by polycondensation of aliphatic or aromatic dicarboxylic acids with glycols, as described, for example, in Oertel, "Polyurethane" (Polyurethanes), Kunststoffhandbuch (Plastics Handbook) (1983) Hanser Verlag Munich, pages 54 to 61. Preferred polyester-diols are condensation products of adipic acid and/or phthalic acid with ethylene glycol and/or 1,4-butanediol. Polyester-diols are also commercially obtainable, for example as Desmophen 2000, 2400S or 2450 from Bayer or Elastophen 8100 from BASF. Polyether-diols can be obtained, for example, by polymerization of ethylene oxide, propylene oxide or tetrahydrofuran. They are also commercially obtainable, for example polypropylene glycol from DOW (for example Voranol P400) or polytetrahydrofuran-diol from Du Pont or BASF. Polytetrahydrofuran-diols are particularly preferably employed as the polyether-diols. The molecular weight of the polyester-diols and polyether-diols are usually 400 to about 3000 g/mol. However, it is also possible to employ polymeric diols having a higher molecular weight, although it is favorable to observe a maximum molecular weight of about 10,000 g/mol because of the high viscosity and melting point.

Low molecular weight diols which are employed in addition to the abovementioned polyester-diols and polyether-diols (polymeric diols) are to be understood as meaning diols having 2 to 12 C atoms in the molecule and a molecular weight of less than about 350 g/mol, dimeric and more highly condensed diols also being possible, in addition to monomeric diols. Examples of low molecular weight diols are ethylene glycol, diethylene glycol, triethylene glycol, propylene glycol, 1,4-butanediol, 1,8-octanediol, 1,10-decanediol or 1,12-dodecanediol. The particular advantage of the low molecular weight diols lies in their action as reactive solvents, whereby, in addition to acting as reaction components for modification of the etherified melamine resins, they also act simultaneously as a solvent. Addition of the low molecular weight diols allows, in particular, controlled adjustment of the optimum viscosities for the impregnation, during which they are simultaneously incorporated into the melamine resin as additional reaction components without it being necessary to use other solvents, which evaporate again during subsequent drying and curing, with simultaneous shrinkage of the resin. The addition of low molecular weight diols moreover improves the storage stability by preventing premature crystallization.

To accelerate the reaction during the modification of the melamine resins with the diols, the usual catalysts can be added, such as, for example, p-toluene-sulfonic acid, in amounts of about 0.1–1% by weight, based on the total amount of the melamine resin.

The web-like fiber reinforcement of the melamine resin prepregs or melamine resin laminates according to the invention preferably consists of a non-woven, woven fabric or fiber woven fabric of glass, carbon, ceramic or aramid fibers. It is also possible to impregnate paper webs with the melamine resin. Mixtures of different fibers, unidirectional continuous fibers or several layers of the same or different reinforcement webs can also be employed, according to the properties required, in particular the strength and rigidity of the laminates.

The prepregs according to the invention are produced by impregnation of the web-like fiber reinforcement with the etherified, modified melamine resin, for example by dipping or spraying and subsequent squeezing off or spreading with a doctor blade until the prepreg has the desired resin content. The resin content of the prepregs depends above all on the properties required for the prepreg or laminate and on the nature of the fiber reinforcement, and is usually 30 to 70% by weight.

The impregnation is usually carried out at temperatures of about 20° to 60° C., according to the viscosity and consistency of the melamine resin. To prevent the melamine resin from flowing out of the prepreg, after the impregnation the prepregs are prereacted at about 80° to 150° C., during which the readily flowing impregnating resin reacts with partial curing and crosslinking to a greater or lesser degree, depending on the temperature and duration of the heat treatment, to give the so-called "B state". In the B state, the prepreg can be stored and transported at about 0° C. and can also be further processed to the desired molding. During this processing, further heat treatment is carried out at about 100° to 200° C., if appropriate under pressure or by compression molding, the prepregs curing with further crosslinking of the melamine resin to the "C state", to give laminates or moldings which can no longer be shaped further.

The resins, prepregs and laminates according to the invention are distinguished above all by improved mechanical properties, as well as by an increased toughness and less shrinkage of the resin during curing. It is furthermore particularly advantageous that the resins according to the invention can be prepared without water or additional solvents which evaporate off again during drying or curing.

The following starting substances were used in the examples below:

a) Etherified melamine resins

HMMM I Hexamethoxyhexamethylmelamine (U100, Chemie Linz)
molar ratio of melamine:formaldehyde:methanol = 1:5.6:5.1
Degree of polymerization 2.0
HMMM II Hexamethoxyhexamethylmelamine (Cymel 303, Cyanamid)
molar ratio of melamine:formaldehyde:methanol = 1:5.8:5.2
degree of polymerization 1.75.
HMBM Hexamethoxyhexabutylmelamine (Cymel 1156, Cyanamid)
molar ratio of melamine:formaldehyde:butanol = 1:5.7:5.1
degree of polymerization 2.9
HMMB Hexamethoxypentamethylbutylmelamine (Cymel 1130, Cyanamid)
molar ratio of melamine:formaldehyde:methanol:butanol = 1:5.8:4.2:1.0
degree of polymerization 2.3
HMME Hexamethoxytetramethyldiethylmelamine (Cymel 1116, Cyanamid)
molar ratio of melamine:formaldehyde:methanol:ethanol = 1:5.8:3.4:2.0
degree of polymerization 1.6 b) Diols

PTH 650 Polytetrahydrofuran-diol (BASF)
molecular weight = 650 g/mol
PTH 1000 Polytetrahydrofuran-diol (BASF)
molecular weight = 1000 g/mol
Voranol P400 Polypropylene glycol (DOW)
molecular weight = 400 g/mol
Desmophen 2000 Condensation product of phthalic acid, adipic acid, ethylene glycol and 1,4-butanediol (Bayer)
molecular weight = 2000 g/mol
Desmophen 2400S Condensation product of phthalic acid, adipic acid, ethylene glycol and 1,4-butanediol (Bayer)
molecular weight = 530 g/mol
EG ethylene glycol (Dow)
PG propylene glycol (Dow)
DPG dipropylene glycol (Dow)
Bu 1,4-butanediol (Riedel de Haen)
Oc 1,8-octanediol (Chemie Linz)

EXAMPLE 1

100 parts by weight of HMMM I were mixed with 33 parts by weight of PTH 650 and 33 parts by weight of dipropylene glycol (DPG) in a stirred container at 60° C., and the mixture was stirred until a modified melamine resin having a viscosity at 20° C. of 3000 mPas was obtained. A glass woven fabric (type US7628 weighing 200 g/m$^2$, Interglas) was then impregnated with the melamine resin by dipping and subsequent passing through squeeze-off rolls at 25° C.. The moist prepreg was prereacted in a heating tunnel at 120° C. for 5 minutes to give a flexible, slightly tacky prepreg in the B state (not yet completely reacted) which had not yet gelled and had a resin content of 50% by weight. The prepreg was then pressed in a hot press under 20 bar at 150° C. for 30 minutes, during which it reacted completely to give a flexible laminate in the C state having a resin content of 40% by weight.

The following properties were measured on the laminates:

| | |
|---|---|
| Flexural strength (N/mm$^2$) | in accordance with EN 63 |

| | and DIN 53452 |
|---|---|
| Impact strength (kJ/m$^2$) | in accordance with ISO/R 180-1961 |
| Notched impact strength (kJ/m$^2$) | in accordance with DIN 53453 (impact bending test) |
| Tensile strength (N/mm$^2$) | in accordance with DIN 53455 and EN 61 |
| Compressive strength (N/mm$^2$) | in accordance with DIN 53454 |
| E modulus (N/mm$^2$) | in accordance with DIN 53457 (tensile test) |
| Elongation (%) | in accordance with DIN 53455 |

The values of the properties are summarized in Table 2.

EXAMPLE 2 to 15

Laminates were produced analogously to Example 1, but the parts by weight of melamine resins and diols shown in Table 1 were used. In Examples 4 and 6 to 15, 0.75% by weight of p-toluenesulfonic acid (Merck), based on the total amount of melamine resins and diols, was additionally added to the mixture as a catalyst.

The laminates are also flexible in the cured state, and on bending and rolling up the resin does not become detached from the fiber reinforcement.

The values of the properties of the laminates are summarized in Table 2.

COMPARISON EXAMPLE V1

A laminate was produced analogously to Example 1, but was impregnated only with HMMM I (without modification with diols). A very hard and brittle laminate having poorer properties than those in the examples according to the invention was obtained. In particular, the laminate cannot be rolled up or bent in the cured state without the polymer matrix becoming detached from the fiber reinforcement.

The values of the properties of the laminate are summarized in Table 2.

TABLE 1

| | Impregnating resins | | |
|---|---|---|---|
| Example | Parts by weight of etherified melamine resin (% by weight) | Parts by weight of polymeric diol (% by weight) | Parts by weight of low molecular weight diol (% by weight) |
| V1 | 100 HMMM I (100) | — | — |
| 1 | 100 HMMM I (60) | 33 PTH 650 (20) | 33 DPG (20) |
| 2 | 100 HMMM I (62) | 31 PTH 650 (19) | 31 EG (19) |
| 3 | 100 HMMM I (50) | 50 Desmophen 2000 (25) | 50 Bu (25) |
| 4 | 100 HMMM I (50) | 50 Desmophen 2000 (25) | 50 PG (25) |
| 5 | 100 HMMM I (57.1) | 25 Desmophen 2000 (14.3) | 50 EG (28.6) |
| 6 | 100 HMME (50) | 50 Desmophen 2000 (25) | 50 EG (25) |
| 7 | 100 HMMB (50) | 50 Desmophen 2000 (25) | 50 EG (25) |
| 8 | 100 HMBM (50) | 50 Desmophen 2000 (25) | 50 EG (25) |
| 9 | 100 HMMM II (50) | 50 Desmophen 2400S (25) | 50 EG (25) |
| 10 | 100 HMMM II (66.6) | 25 PTH 1000 (16.7) | 25 Bu (16.7) |
| 11 | 100 HMBM (66.6) | 25 PTH 1000 (16.7) | 25 EG (16.7) |
| 12 | 100 HMMM II (52.6) | 45 Voranol P400 (23.7) | 45 Bu (23.7) |
| 13 | 100 HMMM II (58.8) | 25 PTH 1000 (14.7) | 45 Oc (26.5) |
| 14 | 100 HMMM II (58.8) | 45 PTH 650 (26.5) | 25 EG (14.7) |
| 15 | 100 HMMM II (83.3) | 10 PTH 650 (8.35) | 10 EG (8.35) |

TABLE 2

| | Properties of the laminates | | | | | | |
|---|---|---|---|---|---|---|---|
| Example | Flexural strength N/mm$^2$ | Impact strength kJ/m$^2$ | Notched impact strength kJ/m$^2$ | Tensile strength N/mm$^2$ | Compressive strength N/mm$^2$ | E modulus N/mm$^2$ | Elongation (%) |
| V1 | 260 | 50 | 30 | 120 | 180 | 14,000 | 2.6 |
| 1 | 290 | 70 | 50 | 150 | 200 | 15,000 | 2.8 |
| 2 | 280 | 60 | 40 | 180 | 210 | 14,500 | 2.7 |
| 3 | 300 | 60 | 35 | 200 | 190 | 14,000 | 2.6 |
| 4 | 270 | 70 | 55 | 160 | 195 | 15,000 | 2.8 |
| 5 | 280 | 60 | 40 | 200 | 190 | 14,500 | 2.7 |
| 6 | 300 | 65 | 50 | 210 | 200 | 15,000 | 2.8 |
| 7 | 290 | 60 | 45 | 210 | 210 | 14,000 | 2.6 |
| 8 | 280 | 70 | 40 | 200 | 210 | 14,500 | 2.7 |
| 9 | 275 | 70 | 55 | 190 | 200 | 14,000 | 2.6 |
| 10 | 280 | 70 | 50 | 170 | 200 | 15,000 | 3.0 |
| 11 | 270 | 65 | 50 | 130 | 210 | 15,500 | 2.7 |
| 12 | 280 | 70 | 55 | 150 | 200 | 14,000 | 2.6 |
| 13 | 290 | 70 | 50 | 180 | 200 | 14,250 | 2.7 |
| 14 | 300 | 75 | 55 | 160 | 190 | 14,000 | 3.0 |
| 15 | 310 | 70 | 50 | 180 | 190 | 14,500 | 2.5 |

What we claim is:

1. Melamine resin prepregs or melamine resin laminates consisting of a web-like fiber reinforcement impregnated with at least partly etherified, modified melamine resins comprising
   a) 40-85% by weight of at least partly etherified melamine resins, which are obtained by reaction of melamine, formaldehyde and alkanols having 1 to 8 C atoms in a molar ratio of melamine:formaldehyde:alkanol of 1:(5 to 6):(4 to 6), and
   b) 60-15% by weight of diols consisting of 25 to 75% by weight of polyester-diols and/or polyether-diols having a molecular weight of at least 400 g/mol and 75 to 25% by weight of low molecular weight diols having 2 to 12 C atoms and a molecular weight of less than about 350 g/mol.

2. Melamine resin prepregs or melamine resin laminates according to claim 1, wherein the at least partly etherified, modified melamine resins comprising
   a) 50 to 70% by weight of at least partly etherified melamine resins and
   b) 50 to 30% by weight of diols.

3. Melamine resin prepregs or melamine resin laminates according to claim 1, wherein the alkanols have 1 to 4 C atoms.

4. Melamine resin prepregs or melamine resin laminates according to claim 1, wherein
   the diols consist of 40 to 60% by weight of polyester-diols and/or polyether-diols and 60 to 40% by weight of low molecular weight diols.

5. Melamine resin prepregs or melamine resin laminates according to claim 1, wherein
   the polyester-diols are condensation products of adipic acid and/or phthalic acid with ethylene glycol and/or 1,4-butanediol.

6. Melamine resin prepregs or melamine resin laminates according to claim 1, wherein
   the polyether-diols are polytetrahydrofuran-diols.

7. Melamine resin prepregs or melamine resin laminates according to claim 1, wherein
   the fiber reinforcement consists of a non-woven, woven fabric or fiber woven fabric of glass, carbon or aramid fibers.

8. Process for the production of melamine resin prepregs or melamine resin laminates, wherein
   a web-like fiber reinforcement is impregnated with at least partly etherified, modified melamine resins comprising
   a) 40–85% by weight of at least partly etherified melamine resins, which are obtainable by reaction of melamine, formaldehyde and alkanols having 1 to 8 C atoms in a molar ratio of melamine:formaldehyde:alkanol of 1:(5 to 6):(4 to 6), and
   b) 60–15% by weight of diols consisting of 25 to 75% by weight of polyester-diols and/or polyether-diols having a molecular weight of at least 400 g/mol and 75 to 25% by weight of low molecular weight diols having 2 to 12 C atoms and a molecular weight of less than about 350 g/mol, and optionally,
   the prepreg obtained during the impregnation is partly or completely cured.

9. Modified at least partly etherified melamine resins comprising
   a) 40–85% by weight of at least partly etherified melamine resins, which are obtained by reaction of melamine, formaldehyde and alkanols having 1 to 8 C atoms in a molar ratio of melamine:formaldehyde:alkanol of 1:(5 to 6):(4 to 6), and
   b) 60–15% by weight of diols consisting of 25 to 75% by weight of polyester-diols and/or polyether-diols having a molecular weight of at least 400 g/mol and 75 to 25% by weight of low molecular weight diols having 2 to 12 C atoms and a molecular weight of less than about 350 g/mol.

* * * * *